(12) United States Patent
Kopp et al.

(10) Patent No.: US 6,303,896 B1
(45) Date of Patent: Oct. 16, 2001

(54) DYNAMIC LASER BALANCING

(75) Inventors: Gary Edward Kopp, Shelby Township; George Elliot Leposky, Belleville; Todd Daniel Freeman, Royal Oak, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/365,629

(22) Filed: Aug. 2, 1999

(51) Int. Cl.[7] .................................................... B23K 26/00
(52) U.S. Cl. ................. 219/121.6; 219/121.65; 219/121.66; 219/121.68; 219/121.69; 219/121.73
(58) Field of Search ........................... 219/121.6, 121.61, 219/121.65, 121.66, 121.67, 121.68, 121.69, 121.73; 73/460, 487

(56) References Cited

U.S. PATENT DOCUMENTS

| | | | |
|---|---|---|---|
| 3,663,795 | * | 5/1972 | Myer ..................................... 219/121 |
| 3,727,027 | | 4/1973 | Kaiser et al. .................. 219/121 LM |
| 3,909,584 | | 9/1975 | Brienza et al. ................ 219/121 LM |
| 4,037,076 | | 7/1977 | Blackaby .......................... 219/121 L |
| 4,257,246 | | 3/1981 | Hartmann et al. ...................... 68/200 |
| 4,446,732 | * | 5/1984 | Schoenfeld ............................. 73/461 |
| 4,653,324 | * | 3/1987 | Nugier ................................... 73/460 |
| 5,046,361 | * | 9/1991 | Sandstrom ............................. 73/460 |

* cited by examiner

Primary Examiner—M. Alexandra Elve
(74) Attorney, Agent, or Firm—Larry Shelton

(57) ABSTRACT

A component (10) to be balanced is fixtured between rotatable fixtures (22, 24) that establish a simulated rotational centerline and is rotated to a preselected rotational speed where the magnitude and angular location of maximum imbalance is determined. An automatic control system (50) generates a laser light pulse locally at the location of imbalance while the component is rotated to remove material of the location with the laser light pulse having a power and/or duration dependent on the amount of material that needs to be removed from the location of imbalance. The sequence is repeated by the automatic control system for additional revolutions of the component until the balance satisfies a preselected balance tolerance range.

8 Claims, 1 Drawing Sheet

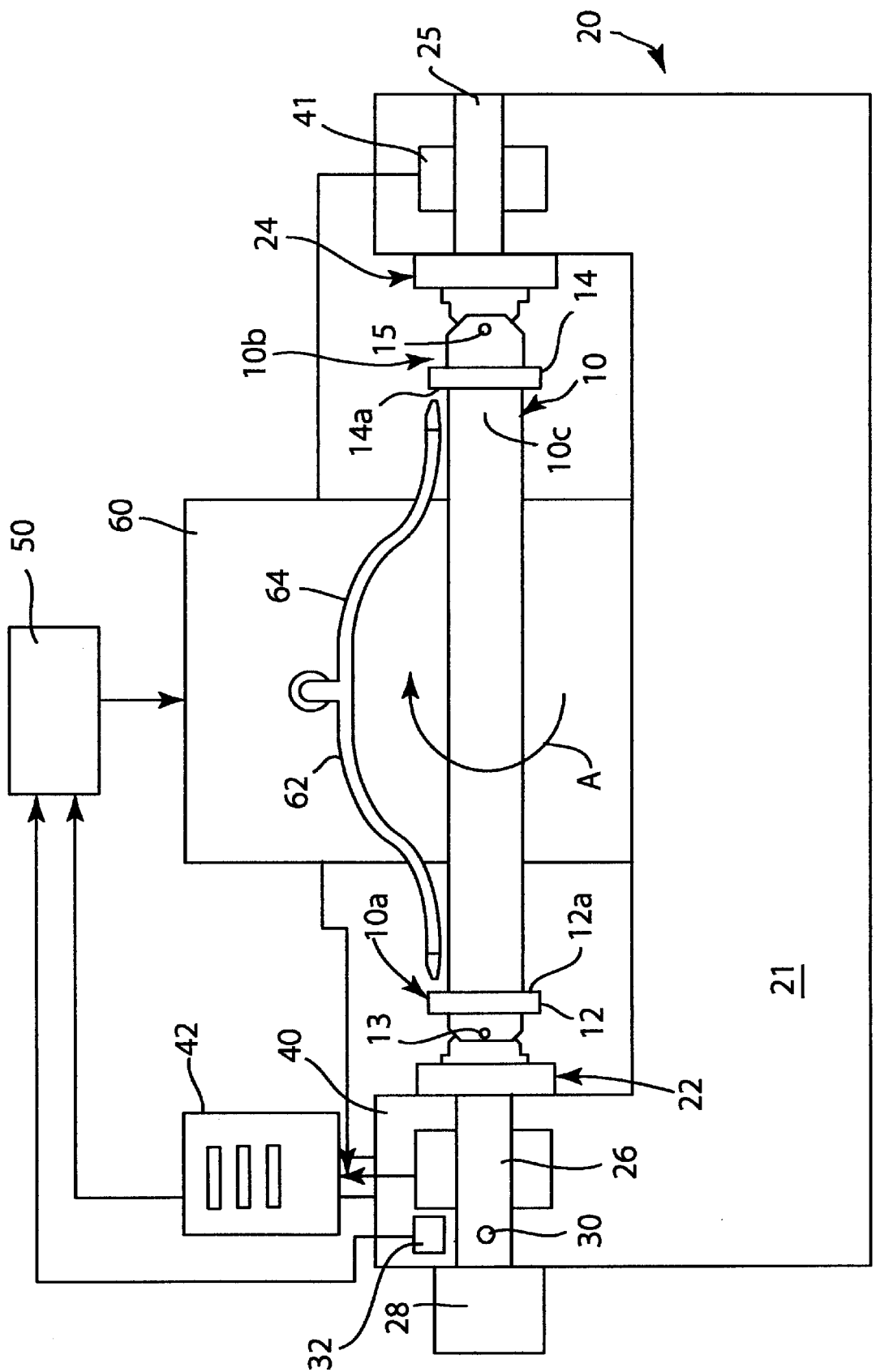

DYNAMIC LASER BALANCING

BACKGROUND OF THE INVENTION

1. Field of the Invention

The invention relates to dynamic laser balancing of a rotating component using laser light pulses directed at imbalance locations of the component until a preselected balance tolerance is met.

2. Description of Related Art

Existing technology for balancing a rotatable vehicle drive shaft (e.g. a propeller shaft) for rear wheel drive vehicles includes rotating the drive shaft up to a selected rotational speed, measuring amount and location of imbalance of the shaft, stopping rotation of the shaft, and adding mass to the shaft to reduce imbalance. The balanced shaft then is rotated back up to the selected rotational speed and remeasured for balance. This sequence is repeated as necessary until shaft balance falls within a preselected tolerance.

An object of the invention is to provide improved method and apparatus for laser balancing vehicle drive shafts as well as other rotating components by removing material in a dynamic, automatic manner to achieve balancing.

SUMMARY OF THE INVENTION

The present invention envisions fixturing a component to be balanced between rotatable fixtures that establish a simulated rotational centerline, rotating the component to a preselected rotational speed, determining the magnitude and angular location of imbalance about the component while the component is being rotated at speed, directing a laser light pulse locally at the determined location of imbalance while the component is rotated, and repeating the sequence while the component continues to rotate until the balance satisfies a preselected balance tolerance. The laser light pulse is directed at the location of imbalance using a control system that activates the laser to direct a laser light pulse at the appropriate time to impinge the location of imbalance with the laser light pulse, which can have a fixed or variable power and/or duration dependent on the amount of material that needs to be removed from the location of imbalance. The control system automatically repeats the above sequence for additional revolutions of the component until the balance of the component satisfies a desired balance tolerance.

In dynamic balancing of a tubular drive shaft of a vehicle having a circumferential flange proximate each end of the shaft, each shaft end is balanced as described above by removing material from the respective flanges in response to measured magnitude and angular location of maximum imbalance by first and second imbalance sensors associated with each end of the drive shaft. The laser includes first and second light transmission members each in fixed position relative to a respective flange in a manner to direct a laser light pulse at each flange to remove material therefrom. Typically, first one end of the drive shaft and then the other end is balanced by removing material from the respective flanges.

The present invention is advantageous in that dynamic balancing of the component is achieved without stopping rotation of the component being balanced, thereby reducing the time required to balance a component, the laser pulse(s) is/are directed locally at the location(s) of imbalance without heating the remainder of the component, and improved balance tolerance can be achieved under control of the automatic control system.

BRIEF DESCRIPTION OF THE DRAWINGS

The FIGURE is an elevational view of dynamic laser balancing apparatus for dynamic balancing of a propeller or drive shaft of a rear wheel drive vehicle pursuant to an embodiment of the invention.

DETAILED DESCRIPTION OF THE PREFERRED EMBODIMENT

The present invention will described herebelow with respect to balancing of a steel, aluminum or other metallic drive or propeller shaft 10 of a rear wheel drive vehicle for purposes of illustration and not limitation, since the invention can be practiced to balance other rotating components made of other materials. The illustrative drive shaft 10 comprises a hollow elongated tubular drive shaft having radially extending, circumferential flanges 12 and 14 proximate opposite ends 10a, 10b. The shaft ends 10a, 10b include respective cross-pins 13, 15 by which the drive shaft 10 is mounted on expandable collet chucks or other fixtures 22, 24 of drive shaft balancing apparatus 20 pursuant to an embodiment of the invention. Similar pins 13, 15 are used to mount the drive shaft 10 between the transmission and the differential of the rear drive of the vehicle as is well known. The collet chuck 22 is rotated by an anti-friction bearing supported shaft 26 driven in rotation by an electrical or other motor 28 connected thereto. The collet chuck 24 is rotatably mounted on anti-friction bearing supported shaft 25 and is driven in rotation via the shaft 10 by rotation of the collet chuck 22. The collet chucks 22, 24, shaft 26, and motor 28 are mounted on the base 21 of the balancing apparatus. Such an arrangement of collet chucks 22, 24, shaft 26, and motor 28 are provided on a model 528RBRQ drive shaft balancing machine available from Schenck Turner Inc., a subsidiary of Schenck Corporation, 100 Kay Industrial Drive, Orion, Mich. 48359.

The drive shaft 10 is fixtured or held between the rotatable collet chucks 22, 24 to establish a simulated rotational centerline of the shaft. The drive shaft 10 so fixtured is rotated as illustrated by arrow A to a preselected rotational speed by shaft 26 and motor 28. The rotational speed is selected based on a correlation to a selected vehicle operating speed range (e.g. 60 to 80 miles per hour). Using the apparatus illustrated, first one end and then the other end of the drive shaft 10 is balanced while the drive shaft 10 is continuously rotated at speed. For example, the end 10a of the drive shaft 10 proximate the flange 12 is balanced first and then the end 10b of the drive shaft proximate flange 14 is balanced, or vice versa.

The amount and angular location of maximum imbalance about each of the first and second ends 10a, 10b of the drive shaft 10 is determined by respective first and second imbalance sensing devices 40, 41. In particular, any weight distributed asymmetrically about the simulated axis of rotation of the drive shaft 10 (established by chucks 22, 24) induces a side loading on the rotated drive shaft 10 which produces shaft vibrations detected by the imbalance device 40 or 41. The imbalance device 40 or 41 sends respective vibration signals (voltage signals respective to the amplitude of vibration) to computer control system 50 that calculates the extent or magnitude and angular location of maximum imbalance about the circumference of the respective end 10a or 10b of the drive shaft 10 based on the sensed shaft vibrations. The extent and location of drive shaft imbalance is displayed on display 42 as magnitude of imbalance in grams-centimeter (or ounces-inch) and location as angular position about the circumference of each end of the drive shaft 10. The invention can be practiced using imbalance devices 40 and 41 available on the aforementioned drive shaft balancing machine from Schenck Turner Inc., a subsidiary of Schenck Corporation, 100 Kay Industrial Drive, Orion, Mich. 48359. Other types of imbalance devices that can be used to practice the invention include model GM balancer available from Balance Engineering Company, 1731 Thorncraft, Troy, Mich., 48084.

The imbalance devices 40, 41 are interfaced to computer control system 50. The control system 50 also is interfaced to rotary shaft position transducer or other sensor 32 that senses rotary position of magnet 30 (or other sensed member) fixedly mounted on the rotating shaft 26. The signal from the transducer 32 is representative of the rotary position of the drive shaft 10 at any instant and is received by the control system 50.

Based on the extent and location of shaft imbalance determined by the imbalance device 40 or 41, the control system 50 activates a laser 60 (laser light source) to direct a laser light pulse at the appropriate time (using the rotary shaft position signal of the transducer 32). The laser light pulse power and/or duration can be fixed or variable and dependent on the amount of material that needs to be removed from the location of imbalance to reduce imbalance toward the preselected balance tolerance. The computer control system 50 determines the laser light pulse power and/or duration using a suitable algorithm that correlates the vibration signal from the imbalance sensing device 40 or 41 to amount and location of material to be removed. The laser light pulse power and/or pulse duration can be varied by the control system 50 to remove the desired material. For fixed pulse power and duration, the number of revolutions of the drive shaft 10 during which the laser light pulse is directed at respective flanges 12, 14 may be varied to remove the desired material. The computer control system 50 can comprise a digital read-out control system available from Balance Engineering Company, 1731 Thorncraft, Troy, Mich., 48084, and that can be programmed to use the algorithm that correlates the vibration signal from the respective imbalance sensing device 40 or 41 to amount of material to be removed from respective flange 12 or 14.

The laser light pulse is directed at respective flange 12 or 14 that is proximate the shaft end 10a or 10b being balanced to remove material therefrom to reduce imbalance. The flanges 12, 14 provide convenient appendages located remote or away from the cylindrical tubular drive shaft wall 10c where material can be removed without damaging (e.g. heat warping) the tubular drive shaft wall itself. The laser light pulse is directed by respective first and second light transmission members 62, 64 (e.g. glass filaments) disposed proximate the respective flanges 12, 14 and communicated to a common laser light source 60. A mirror switch (not shown) associated with the laser directs the laser light pulse through one or the other of light transmission members 12, 14 depending upon which end 10a or 10b of the drive shaft 10 is being balanced. The light transmission members 62, 64 are disposed in fixed position relative to the respective flange 12, 14 in a manner to direct a laser light pulse at respective inner-facing surfaces 12a or 14a of flanges 12, 14. To this end, each light transmission member 62, 64 includes a respective length fixedly held by a suitable holder, bracket, weldment or other positioning device (not shown) in parallel orientation to the simulated rotational centerline established by collet chucks 22, 24 so as to direct a laser pulse perpendicularly to each respective flange surface 12a or 14a to remove material therefrom by vaporization. For balancing a steel or aluminum drive shaft 10, a laser 60 comprising a Nd:YAG laser, carbon dioxide laser or other laser can be used in practicing the invention so long as it can provide repeated laser light pulses effective to vaporize material in required amounts from the flange surfaces 12a or 14a.

In balancing a respective end 10a or 10b of the drive shaft 10, the control system 50 automatically repeats the above sequence for additional revolutions of the drive shaft 10 where the magnitude and location of any remaining maximum imbalance at the end 10a or 10b of the drive shaft 10 being balanced is determined for each shaft revolution and compared to the tolerance range for balance at each shaft end. The control system 50 directs another laser light pulse at the maximum imbalance location on respective flange surface 12a or 14a proximate that shaft end to remove further material and thereby further reduces imbalance. The location of maximum shaft imbalance relative to each flange 12, 14 can change during dynamic laser balancing.

This sequence is repeated by the control system 50 for further shaft revolutions until the balance at that end of the drive shaft 10 is reduced sufficiently to fall within a preselected balance tolerance range. For purposes of illustration only, a laser light pulse can be directed at the maximum imbalance location during the second, third or more revolutions of the drive shaft 10 to remove material therefrom until balance at each end 10a or 10b of the drive shaft 10 is within the preselected tolerance range. Then, the other end of the drive shaft 10 is balanced in like manner.

If a powerful enough laser 60 is provided, the opposite ends 10a, 10b of the drive shaft 10 proximate the flanges 12, 14 can be concurrently balanced using laser light pulses directed through the light transmission members 62, 64 at the flanges 12, 14. Alternately, a separate laser 60 and associated light transmission member can be provided for concurrently balancing each end of the drive shaft 10.

Once the opposite ends of the drive shaft 10 are balanced to within the preselected balance tolerance range, rotation of the drive shaft 10 is terminated, and the drive shaft is removed from the collet chucks 22, 24. The next drive shaft to be balanced then is fixtured between the collet chucks and balanced as described above.

While the invention is described above in terms of specific embodiments, it is not intended to be limited thereto but rather only to the extent set forth in the following claims.

What is claimed is:

1. A method of dynamic balancing a component, comprising fixturing the component to be balanced between rotatable fixtures to establish a simulated rotational centerline, rotating the component to a rotational speed, determining magnitude and angular location of imbalance while the component is being rotated at speed, directing a laser light pulse from a fixed position at a time to impinge locally at the location of imbalance to remove material therefrom while the component is rotated, and repeating the sequence while the component continues to rotate until balance satisfies a preselected tolerance.

2. The method of claim 1 wherein the laser light pulse is directed at the location of imbalance by a light transmission member fixed in position and communicated to a laser light source.

3. A method of dynamic balancing a vehicle drive shaft, comprising fixturing the drive shaft to be balanced between rotatable fixtures to establish a simulated rotational centerline, rotating the drive shaft to a rotational speed, determining magnitude and angular location of imbalance at each end of the drive shaft while the drive shaft is being rotated at speed, directing a respective laser light pulse from a respective fixed position at a respective time to impinge locally at the location of imbalance at each respective end to remove material therefrom while the drive shaft is rotated, and repeating the sequence as necessary at each end while the drive shaft continues to rotate until balance at each end satisfies a preselected balance tolerance.

4. The method of claim 3 wherein said drive shaft includes first and second appendages proximate opposite ends thereof located away from a tubular drive shaft wall and the laser light pulse is directed at each appendage to remove material therefrom after the magnitude and angular location of imbalance relative to the respective first and second appendages is determined.

5. The method of claim 4 wherein a plurality of laser light pulses are directed at the first appendage to balance the end of the drive shaft proximate said first appendage and then a plurality of laser light pulses are directed at the second appendage to balance the end of the drive shaft proximate said second appendage.

6. The method of claim 5 wherein the first laser light pulse is directed at the first appendage through a first light transmission member fixed in position and communicated to a laser light source and the second laser light pulse is directed at the second appendage through a second light transmission member fixed in position and communicated to said laser light source.

7. The method of claim 1 including the step of sensing rotary position of the component and determining said time in response to the rotary position.

8. The method of claim 3 including the step of sensing rotary position of the drive shaft and determining said time in response to the rotary position.

* * * * *